Jan. 3, 1967  T. E. BROWN  3,295,498
CONVERTIBLE BIRD HOUSE AND BIRD FEEDER
Filed July 22, 1965  4 Sheets-Sheet 1

INVENTOR.
THOMAS E. BROWN
BY Robert J Doherty
ATTORNEY

Jan. 3, 1967 T. E. BROWN 3,295,498
CONVERTIBLE BIRD HOUSE AND BIRD FEEDER
Filed July 22, 1965 4 Sheets-Sheet 2
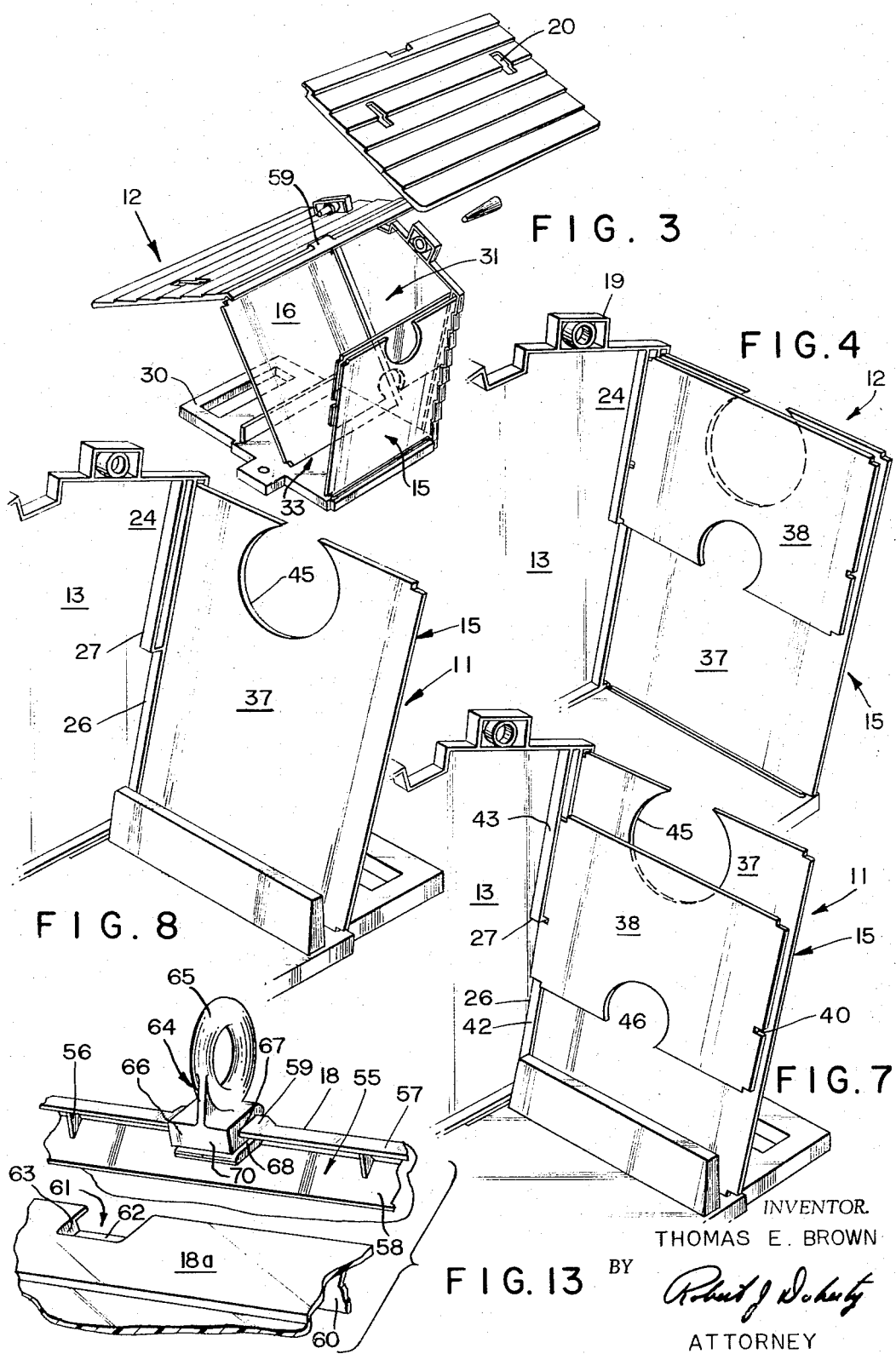
INVENTOR.
THOMAS E. BROWN
BY
Robert J Doherty
ATTORNEY Jan. 3, 1967　　　　　T. E. BROWN　　　　　3,295,498
CONVERTIBLE BIRD HOUSE AND BIRD FEEDER
Filed July 22, 1965　　　　　　　　　　　　4 Sheets-Sheet 3

INVENTOR.
THOMAS E. BROWN
BY
ATTORNEY

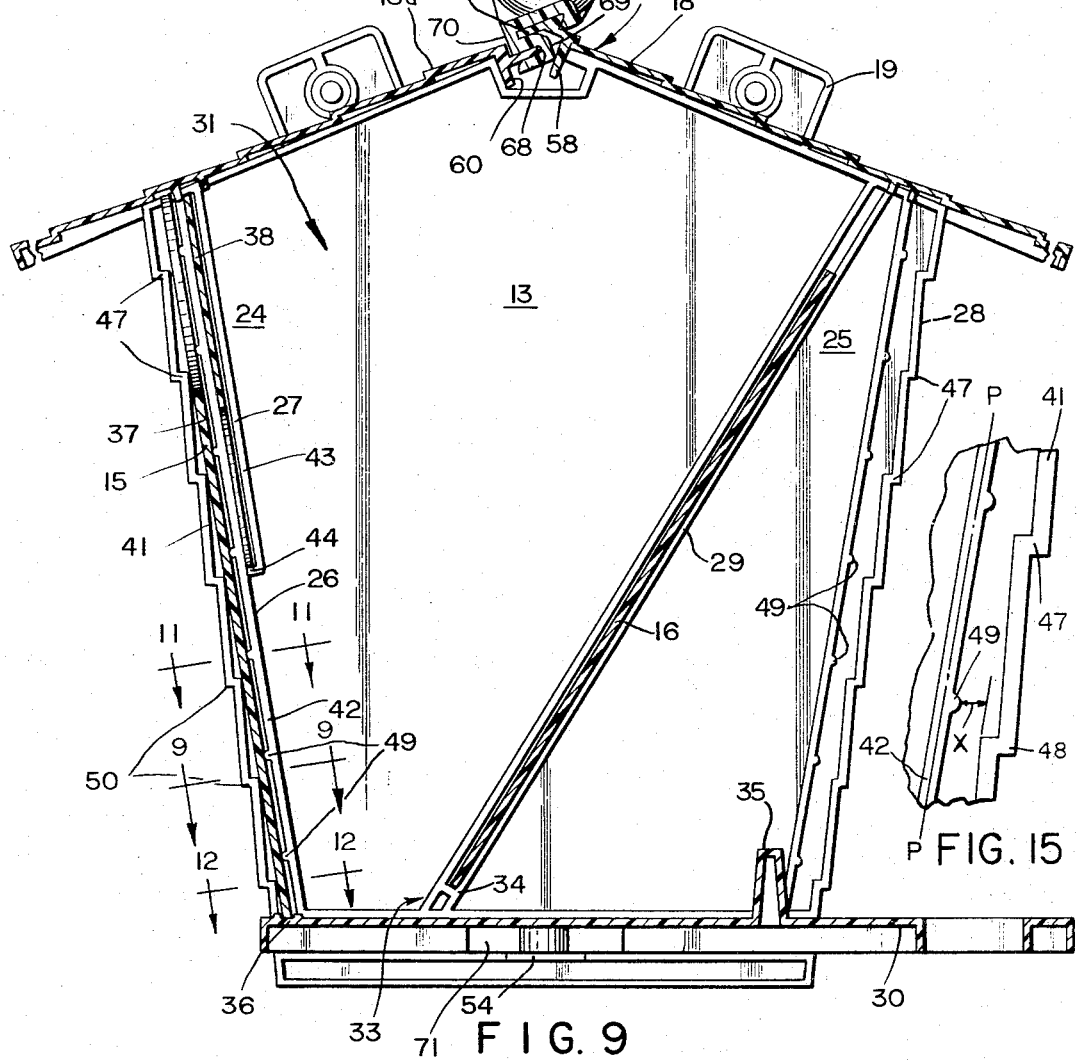

United States Patent Office 3,295,498
Patented Jan. 3, 1967

1

3,295,498
CONVERTIBLE BIRD HOUSE AND
BIRD FEEDER
Thomas E. Brown, Slatersville, R.I., assignor to Rexall
Drug and Chemical Company, Los Angeles, Calif., a
corporation of Delaware
Filed July 22, 1965, Ser. No. 474,054
8 Claims. (Cl. 119—23)

This invention relates generally to a bird station and more particularly to a bird station which may be utilized in a primary constructional position as a bird house and in an alternate secondary constructional position as a bird feeder.

The present invention also relates to a bird station construction wherein novel means are provided for varying the entrance opening when such bird station is assembled in its primary bird house constructional position so that the bird house is suitably adapted to attract a greater number of bird species through the varied entrance opening sizes made available by the present construction as well as making it possible to particularly attract certain desirable bird species.

Another feature and object of the present invention is the provision of novel constructional aspects of the bird station including end wall connecting means, roof section connecting means and main panel pin connecting means which make possible a bird station construction which is easily assembled in a neat, workable manner and which is furthermore disassemblable and re-assemblable to alternate construction positions with a high degree of ease.

With the above features and objects in view, and others that will hereinafter appear, the nature of the invention will be more clearly understood by reference to the following detailed description, the appended claims, and the several views illustrated in the accompanying drawings.

In the drawings:

FIGURE 3 is a partially exploded perspective view of the bird feeder of the present invention with parts removed for clarity and is viewed from the side opposite that shown in FIGURE 2 of the drawings;

FIGURE 4 is a partial perspective view of the bird feeder and shows in particular the construction of one end wall thereof;

FIGURE 7 is a partial perspective view of the bird house shown in FIGURE 5 of the drawings and shows a second end wall entrance opening;

FIGURE 8 is a perspective view of a bird house similar to those shown in FIGURES 6 and 7 but showing an alternate end wall entrance opening therefor;

FIGURE 9 is a sectional view taken along the line 9—9 of FIGURE 2;

FIGURE 10 is a sectional view taken along the line 10—10 of FIGURE 9;

FIGURE 11 is a sectional view taken along the line 11—11 of FIGURE 9;

FIGURE 12 is a sectional view taken along the line 12—12 of FIGURE 9;

2

Figure 14:
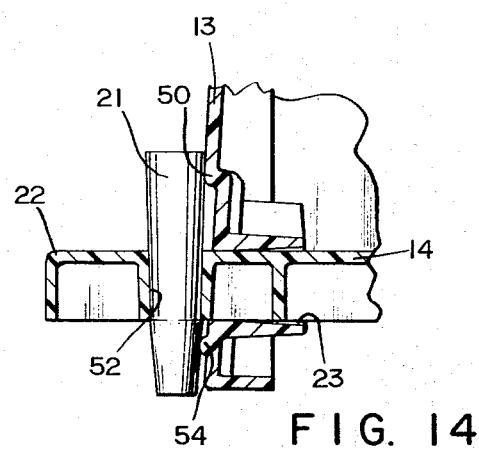

FIGURE 13 is a partial perspective view of the roof construction and roof panel connecting means of the present invention; and FIGURE 14 is a sectional view taken along the line 14—14 of FIGURE 9 and shows in particular the novel main panel pin connecting means of the present invention.

FIGURE 15 is an enlarged view of a portion of the second edge portion of side wall 13.

Throughout the specification, like reference numerals are used to indicate like parts.

Figure 1:
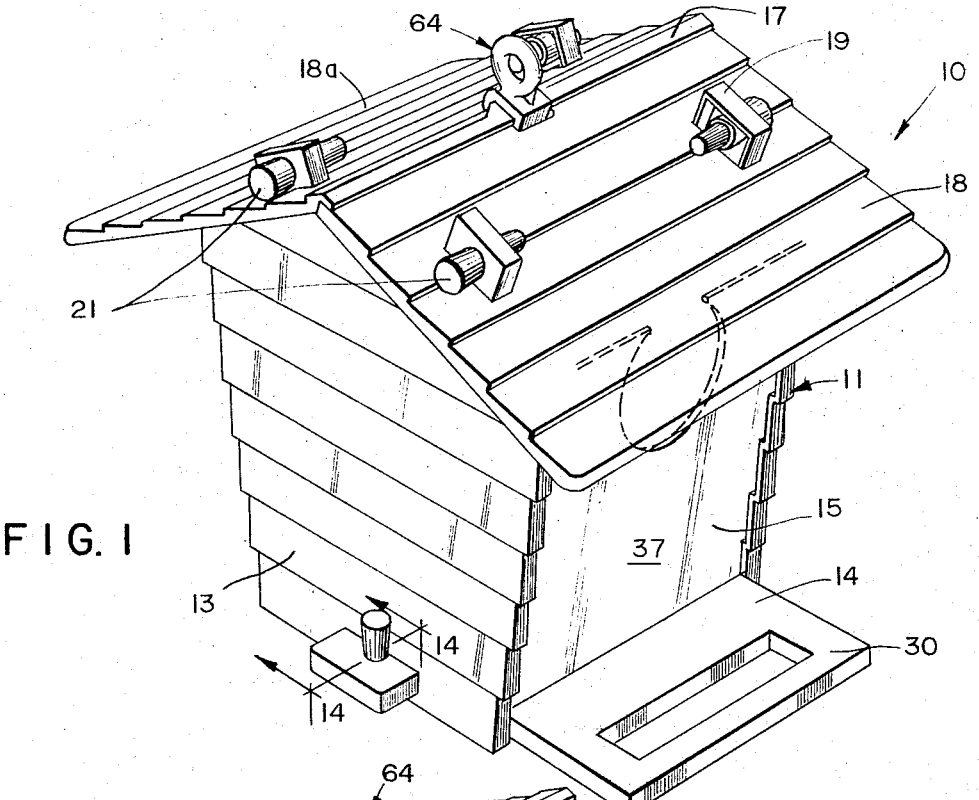
FIGURE 1 is a perspective view of the bird station of the present invention in its primary constructional position as a bird house.
Figure 2:
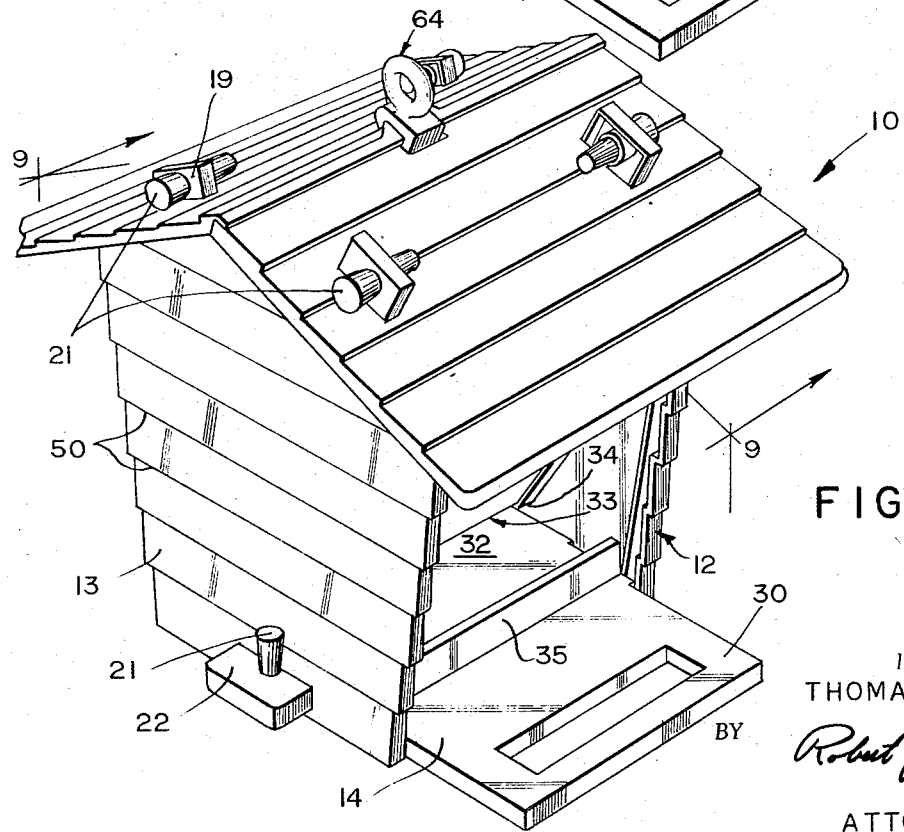
FIGURE 2 is a perspective view of the bird station of the present invention in its secondary constructional position as a bird feeder.

As initially shown in FIGURES 1 and 2 of the drawings, the bird station 10 of the present invention may be assembled in a primary constructional position as a bird house 11 as shown in FIGURE 1 and a bird feeder 12 as shown in FIGURE 2. The bird station 10 is made up in part by side walls 13 which are adapted for upstanding parallel relationship to each other, a bottom platform 14, end walls 15 and 16, and the roof assembly 17 comprising roof panels 18 and 18a.

Each of the side walls 13 is of a generally planar configuration and is provided at the top thereof with a peaked or triangular configuration. The peaked top edge of each of the side walls 13 is further provided at either side thereof with an ear projection 19, which ear projections are adapted to extend above the roof panels through slotted ear openings 20 therethrough. Tapered pins 21 are utilized to connect the respective roof panels 18, 18a to the side walls 13. Similar ear projections 22 are provided centrally along either side of the bottom platform 14 for projection through side wall slotted openings 23. In this manner then, the bottom platform 14 may be joined to the respective side walls 13 by similarly tapered pins 21 by means of particular constructional features which will hereinafter be more clearly set out.

The left side of the side wall 13 shown in FIGURE 9 of the drawings has been designated as the first end 24 thereof while the right hand side thereof has been designated the second side wall end 25. The first end wall 15 is accordingly adapted for placement between the respective side walls 13 at the first side wall ends 24 thereof while the second end wall 16 is adapted for placement between respective second side wall ends 25 of the side walls 13. At each first side wall end 24 there is further provided primary and secondary first end wall connecting means generally disposed in parallel proximate position to each other along the side edge thereof and respectively designated by reference numerals 26 and 27. On the other hand, the second side wall ends 25 of the side walls 13 are provided with primary and secondary second end wall connecting means respectively designated by reference numerals 28 and 29. The primary second end wall connecting means 28 is disposed along the side edge of the second wall end 25 whereas the secondary second end wall connecting means 29 is disposed inwardly thereof and downwardly slanted therefrom as best shown in FIGURES 3 and 9 of the drawings.

Figure 5:
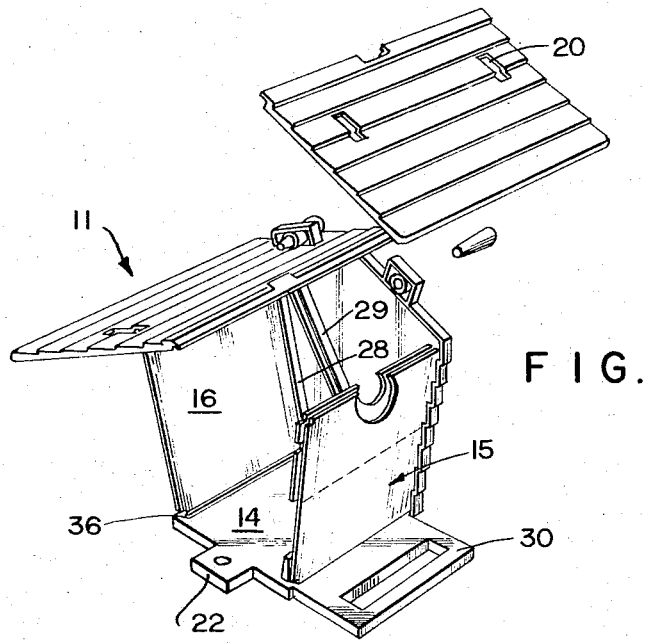
FIGURE 5 is a partially exploded perspective view similar to FIGURE 3 but showing the bird station in a bird house position similar to that shown in FIGURE 1 of the drawings but with parts removed for clarity.
Figure 6:
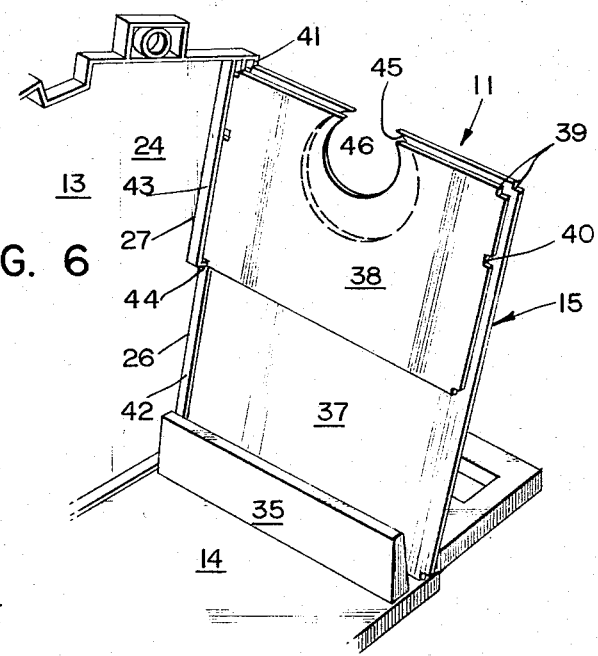
FIGURE 6 is a partial perspective view of the bird house shown in FIGURE 5 exhibiting one end wall entrance opening thereof.

It is thus apparent that there are alternate positions in which the first end wall 15 and the second end wall 16 may be placed between the side walls 13 at respective first and second side wall ends 24 and 25 thereof. Thus, when the bird station 10 of the present invention is used in its primary construction as a bird house 11 the first end wall 15 takes one of the alternate positional forms as shown in FIGURES 6 through 8 of the drawings. Alternately, when the bird station 10 is constructed in its secondary position as a bird feeder 12, the first end wall 15 takes the form as shown in FIGURE 4 of the drawings whereas no entrance opening is present. The position of the second end wall 16 in its primary constructional position as a bird house is that as shown in FIGURE 5 of the drawings wherein such is placed generally normally between the second side wall ends 25 of the side walls 13 and in operational contact with the primary second end wall connecting means 28 thereof. Alternately, the second end wall 16 may be placed in its secondary position also at the second side wall ends 25 of the side walls 13 and in operational contact with the secondary second end wall connecting means 29 as best shown in FIGURES 3 and 9 of the drawings. It should be also noted that the bottom platform 14 is alternatively positioned in opposite directions dependent upon the particular operational construction utilized, that is, the end of the platform having perch means 30 located thereat is positioned proximate the first side wall ends 24 in its primary constructional position as a bird house and toward the second side wall ends 25 in its secondary constructional position as a bird feeder.

Reference is now had to FIGURES 2 through 4 and 9 of the drawings wherein the particular construction and operation of the bird feeder 12 may be had in reference thereto. Thus, it may be seen that the bird feeder 12 includes a feed storage hopper 31 formed by the coaction of the first end wall 15 in its position as shown in FIGURE 4, the bottom platform 14 and the second end wall 16 in its secondary slanted position as shown in FIGURE 9 of the drawings. Feed from this storage hopper 31 flows by gravity to the adjoining feed apron 32 and through an elongated passage 33 made possible by the provision of a stop element 34 at the lower end of the secondary second end wall connecting means so as to space the second end wall 16 above the base of the platform member 14. The platform member 14 is also provided with an elongated barrier 35 upstanding from the top surface thereof proximate the perch means 30. The end of the platform distal from the barrier 35 is also provided with an upstanding groove 36 for the receipt of the bottom portion of the end wall 15 or 16 dependent upon the position of the platform. Thus it may be seen that in the platform position as a bird feeder as shown in FIGURE 9 of the drawings, the groove is to the left thereof for receipt of the lower portions of the first end wall 15 whereas the barrier 35 is positioned on the other end thereof so as to prevent the scattering of feed present in the feed area 32. Alternately, the barrier 35 would be positioned slightly inwardly of the secondary first end wall connecting means 27 and the groove 36 would be positioned beneath the primary second end wall connecting means 28 for receipt of the second end wall 16 when the bird station 10 was placed in its primary constructional position as a bird house 11. It should be noted that the barrier 35 and the groove 36 further serve to prevent possible inward deflection of central portions of the end walls 15 and 16 by their respective placement as above pointed out.

Reference is now had to FIGURES 1 and 5 through 8 of the drawings, in particular, wherein the primary constructional set-up of the bird station 11 as a bird house 11 is most clearly set forth. It is in this position that the several entrance openings of varying sizes may be positioned for the desired attraction of a varied number of bird species by the provision of a first end wall 15 having separate primary and secondary component sections. These primary and secondary component sections of the first end wall are referred to respectively by reference numerals 37 and 38 and are adapted for respective engagement with the primary and secondary first end wall connecting means 26 and 27. In this primary constructional embodiment, each of the several positions possible with the first end wall 15 are accomplished while the second end wall 16 is positioned at its primary position in operational contact with the primary second end wall connecting means 28 as best shown in FIGURE 5. Each of the first end wall sections 37 and 38 are provided at their upper and lower ends thereof with small cut-out portions 39, which cut-outs are of a thickness approximately equal to the thickness of the side walls 13 so as to permit the first end wall 15 to evenly abut respective side walls 13 so as to present a smooth continuing surface upon which the roof panels 18 and 18a may be supported. The side walls of the secondary first end wall section 38 are provided with an intermediate slot 40 approximately centrally located for placement in an intermediate position such as shown in FIGURE 7 of the drawings and in contact with the secondary first end wall connecting means 27 in a manner which will be hereinafter brought out in further detail.

The primary first end wall connecting means 26 is formed by a first end wall connecting wall 41 located at the terminal portions of the first end side of the side walls 13 and extending generally normally thereto. An intermediate connecting wall 42 is located slightly inwardly thereof and an inner connecting wall 43 is located inwardly of the intermediate connecting wall 42 and extends downwardly from the top edge of the respective side walls 13 and terminates short of the bottom platform 14 in a terminal ledge 44. This ledge 44 serves as a positioning means for the secondary first end wall section 38 by coaction with the side slots 40 thereof.

The primary first end wall section 37 and the secondary first end wall section 38 are respectively provided with openings 45 and 46 respectively. The primary first end wall section opening 45 is larger than the opening 46. The openings 45 and 46 are located proximate the upper edges of the respective sections 37 and 38 and may interrupt such upper edges as shown in the drawings. The openings are also generally located to overlay one another as when the upper edges of the sections 37 and 38 are placed in superposed relationship with each other. Accordingly, entrance openings in the bird house 11 are of varied dimension and may be formed for the attraction of birds of varied sizes. Thus, FIGURE 6 of the drawings illustrates a first position exhibiting an entrance opening of intermediate size in the first end wall 15 wherein both primary and secondary sections 37 and 38 thereof are respectively fully supported in upright position by means of the primary and secondary first end wall connecting means 26 and 27. Alternatively, another position wherein the entrance opening is less than that shown in FIGURE 6 of the drawings may be arrived at by the positioning of the primary and secondary sections 37 and 38 as shown in FIGURE 7 of the drawings wherein the first section 37 is fully uprightly supported by the primary first end wall connecting means 26 and wherein the secondary section 38 is intermediately downwardly supported by the interaction of the terminal ledge 44 of the secondary first end wall connecting means 27 and the side slots 40 in the secondary section 38. Thus, in this position a portion of the larger opening 45 is eclipsed by the lower edge of the secondary section 38 so as to reduce the size of the resultant entrance opening.

Still another position is arrived at as shown in FIGURE 8 of the drawings by the upright position of the primary first end wall section 37 with the secondary section 38 removed so that the full opening 45 is permitted to be utilized as an entrance through the first end wall section 15.

Turning now to FIGURES 9 through 12 of the drawings, the preferred manner in which the end walls are supported in relationship with the side walls is more particularly set forth. This connection construction will be explained in relationship to the first side wall ends 24 and the primary first end wall connecting means 26 thereof although it should be understood that the essential construction thereof is preferably also utilized in regard to the second side wall ends 25 and the primary second end wall connecting means 28. Thus, it may be seen that the terminus of the first side edge 24 of the side wall 13 is provided with the connecting wall 41 extending normally therefrom and with an intermediate connecting wall 42 located inwardly thereof and also projecting normally therefrom. It should be noted that the connecting wall 41 is downwardly and inwardly stepped so as to present a series of inwardly directed shoulders 47 and alternate outwardly directed portions 48 therebetween. The connecting wall 42 is located inwardly of the connecting wall 41 and is provided at the inner side thereof with a series of outwardly directed bead extensions 49 spaced therealong so as to be in offset position with the shoulders 47 of the connecting wall 41. In this manner then, the normal distance X in relation to the plane P (both X and P are represented in FIG. 15) between each resultant bead and shoulder series is adapted to be generally equal to the thickness of the first end wall 15 disposed therein. In this manner then, the end wall 15 may be inserted between the respective first ends 24 of the side walls 13 without the addition of a further connecting wall apart from that presented by the normal positioning of the connecting wall 41 projecting from the terminus of the first end edge 24 of the side wall 13. Also the alternative spacing between the shoulders 47 and the beads 49 reduces to a great extent the criticality of the normal distance above referred to therebetween and thus an end wall 15 may be more easily positioned therebetween.

Turning now to the preferred means by which the bottom platform 14 is joined to the respective side walls 13, reference is made to FIGURE 14 of the drawings. It should be noted in connection therewith that the outer surfaces of the side walls 13 are downwardly stepped as also shown in FIGURES 1 and 2 so as to present a regular series of inwardly directed shoulders 50. As previously mentioned the bottom platform 14 is provided with ears 22 extending from the sides thereof, which ears are provided with a central opening 52 therethrough for receipt of a tapered pin 21. Proximate the bottom edge of the respective side walls 13, a slotted ear opening 23 is provided at either side thereof for receipt of the ears 22. Proximate the slotted ear openings 23 and downwardly thereof there is provided at either side an outwardly directed ledge 54 positioned so as to be in line of the ear opening 52. It should be noted that the longitudinal extent of each tapered pin 21 is slightly greater than the space between each series of shoulders 50 and in particular of a longitudinal extent greater than the distance between the lowermost shoulder 50 and the ledge 54. In this manner then, the pin 21 may be inserted in the opening 52 in an upright position rather than one in which the upper portions thereof are outwardly directed away from the side wall 13 at the lowermost shoulder 51 thereof which would necessarily be the case if the ledge 54 were omitted and accordingly prevents undesirable skewed wedging effects which would make it difficult to remove the pins 21 from the ear openings 52.

Turning now to FIGURES 9 and 13 of the drawings, there is therein presented the constructional details of the roof assembly 17 comprising panels 18 and 18a. The panel 18 is, as is the panel 18a, generally planar in configuration and provided with ear openings 20 therethrough for receipt of the ears 19 of the side walls 13 and connection thereto by means of tapered pins 21. The inner longitudinal edge of the panel 18 is provided with abutment means 55 for the opposing inner longitudinal edge of the other panel 18a. Such abutment means as best shown in FIGURE 13 of the drawings is comprised in part of a series of longitudinally spaced lateral reinforcing ribs 56 formed integrally between a longitudinal flap 57 and the downwardly extending wall 58. The flat longitudinal flap 57 is integral with the inner edge of the panel 18 and is further provided with a flap projection 59 which extends upwardly and outwardly thereof and is centrally located in respect thereto.

The panel 18a on the other hand is provided with a downwardly extending wall 60 similar to the wall 58 of flap 18. It should be noted that both such walls 58 and 60 are located slightly laterally outwardly from the respective inward peripheral edge of the panels 18 and 18a. The panel 18a is further provided with a centrally located inset 61 at the inner edge thereof comprising a lower wall 62 having in turn an inner edge 63. The panel 18a is adapted to contact the abutment means 55 with the inner peripheral edge thereof in such a manner that the inset 61 is positioned laterally opposite the flap projection 59.

A roof panel connecting member 64 having suspending means 65 serves to connect the panels 18 and 18a together centrally thereof. Such connection is afforded by means of the generally S-shaped lower portion 66 of the roof panel connecting member 64 which exhibits upper and lower U-shaped concave channels 67 and 68 respectively and intermediate and upper U-shaped bosses 69 and 70 respectively. It may then be seen from FIGURE 9 that the lower wall 62 of the inset 61 is adapted to be inserted into the lower U-shaped channel 68 until that point where the upper boss 70 contacts the inner edge 63 thereof. In this position the inner edge of the panel 18a also contacts the ribs 56 so as to provide a positive seating therefor. In addition the upper U-shaped channel 67 is adapted for grasping contact with the flap projection 59 and the intermediate boss 69 positioned intermediate the flap 57 and the wall and preferable in contact with one of the ribs 56. There is therein provided means by which the panels 18 and 18a may be easily joined together and means provided whereby the bird station 10 may be suspended. It should be also noted that the bottom of the platform 14 may be provided with a downwardly extending circular boss 71 whereby the bird station may be supported from a pole or the like.

It is believed that there has been presented above a bird station construction which accomplishes the object of the present invention in an expedient manner. However, attention is directed to the fact that variations may be made in the constructional details as hereinbefore presented without departing from the spirit and scope of the invention, as defined in the appended claims.

I claim:

1. A bird station operable in a primary constructional position as a bird house and in a secondary constructional position as a bird feeder, comprising generally vertically disposed side wall members in substantial parallel opposed relationship to each other, an interconnecting generally horizontal bottom platform member disposed normally therebetween and first and second upstanding end walls in opposed relationship to each other and interconnected between such side walls at respective first and second ends thereof, each side wall having primary and secondary end wall connecting means positioned proximate the second end thereof wherein said second end wall is connected to said side walls in said primary position by means of said primary connecting means and to said secondary connecting means in said secondary position, and said platform reversible from the primary bird house position wherein one end of the platform is disposed toward said first end wall to the secondary bird feeder position wherein said one end of said platform is disposed toward said second end wall.

2. A bird station operable in a primary constructional position as a bird house and in a secondary constructional position as a bird feeder, comprising generally vertically disposed side wall members in substantial parallel opposed relationship to each other, an interconnecting generally horizontal bottom platform member disposed normally therebetween and first and second upstanding end walls in opposed relationship to each other and interconnected between such side walls at respective first and second ends thereof, first end wall connecting means disposed at respective first ends of said side walls, primary and secondary end wall connecting means disposed at respective second end of said side walls, said primary second end wall connecting means generally disposed along the side edge of said side wall second end, said secondary end wall connecting means disposed generally inwardly of said primary end wall connecting means and downwardly inwardly slanted from an uppermost position proximate the intersection of the side and top edges of said side wall to a lowermost position terminating short of said platform, and said platform reversible from the primary bird house position wherein one end of the platform is disposed toward said first end wall to the secondary bird feeder position wherein said one end of said platform is disposed toward said second end wall.

3. A bird station operable in a primary constructional position as a bird house and in a secondary constructional position as a bird feeder, comprising generally vertically disposed side wall members in substantial parallel opposed relationship to each other, an interconnecting generally horizontal bottom platform member disposed normally therebetween and first and second upstanding end walls in opposed relationship to each other and interconnected between such side walls at respective first and second ends thereof, said first end wall having first and second portions, primary and secondary first end wall connecting means generally disposed in parallel proximate position to each other along the side edge of said side wall first end, primary and secondary end wall connecting means disposed at respective second end of said side walls, said primary second end wall connecting means generally disposed along the side edge of said side wall second end, said secondary second end wall connecting means disposed generally inwardly of said primary second end wall connecting means and downwardly inwardly slanted from an uppermost position proximate the intersection of the side and top edges of said side wall to a lowermost position terminating short of said platform, and said platform reversible from the primary bird house position wherein one end of the platform is disposed toward said first end wall to the secondary bird feeder position wherein said one end of said platform is disposed toward said second end wall.

4. A bird station comprising generally vertically disposed side wall members in substantial parallel opposed relationship to each other, an interconnecting generally horizontal bottom platform member disposed normally therebetween, first and second upstanding end walls in opposed relationship to each other and interconnected between said side walls at respective first and second ends thereof and a roof supported by said side walls, said roof comprising two panels, each of said panels inwardly upwardly disposed and connected along a central roof peak formed thereby, one of said panels having abutment means at the inner longitudinal edge thereof in contacting receipt of the inner longitudinal edge of the other panel, said one panel further having a flat longitudinal flap integral with and extending inwardly of said abutment means and over the inner edge of said other panel, said one panel further provided with a flap projection integral with and extending upwardly and outwardly of said flap centrally thereof, a downwardly stepped inset positioned centrally of said other panel at the inner edge thereof, said inset comprising a lower wall having an inner edge spaced from said abutment means and outwardly terminating in shoulder means, and a roof panel connecting member having a generally S-shaped cross-sectional configuration exhibiting upper and lower U-shaped concave channels and an intermediate U-shaped boss, wherein said upper channel contacts said flap and said flap extension, said intermediate boss contacts said abutment means and wherein said lower channel is in receipt of said inset lower wall to an extent determined by said shoulder means.

5. A bird station construction having a variable position end wall comprising side walls upstanding in opposed relation having first and second end walls disposed generally normally therebetween, each of said side walls having at one respective end thereof primary and secondary first end wall connecting means disposed in parallel proximate position to each other along the side edge of said one end of said side wall, said first end wall having separate primary and secondary component sections for respective engagement with said primary and secondary first end wall connecting means, each of said component first end wall sections being generally planar and having an opening therethrough proximate their upper edges, which openings overlay each other when the upper edges of said sections are in superposed relationship, said secondary section being of a lesser height and is provided with intermediate mounting means along the sides thereof for intermediate positioning with said secondary connecting means.

6. A bird station construction having a variable position end wall comprising side walls upstanding in opposed relation having first and second end walls disposed generally normally therebetween, each of said side walls having at one respective end thereof primary and secondary first end wall connecting means disposed in parallel proximate position to each other along the side edge of said one end of said side wall, said secondary first end wall connecting means positioned inwardly of said primary connecting means and downwardly terminating short thereof, said first end wall having separate primary and secondary component sections for respective engagement with said primary and secondary first end wall connecting means, each of said component first end wall sections being generally planar and having an opening therethrough proximate their upper edges which openings overlay each other when the upper edges of said sections are in superposed relationship, said secondary section being of a lesser height and is provided with intermediate mounting means along the sides thereof for intermediate positioning with said secondary connecting means, and said first end wall exhibiting three alternate positions including a first position exhibiting an entrance opening in said first end wall wherein both primary and secondary sections thereof are respectively fully supported in upright position by said primary and secondary connecting means; a second position exhibiting a smaller entrance opening than said first position wherein said primary section is fully uprightly supported by said primary connecting means and wherein said secondary section is intermediately downwardly supported by said secondary connecting means so that a portion of the primary section opening is covered by a lower edge portion thereof; and a third position exhibiting no entrance opening wherein said primary section is fully uprightly supported by said primary connecting means and wherein said secondary section is fully downwardly supported by said secondary connecting means so that the entire primary section opening is covered by a lower edge portion thereof.

7. A bird station comprising a bottom platform, generally parallel opposed side walls upstanding therefrom and generally planar end walls disposed between and normal to said side walls, said side walls having at least one pair of opposed side edges, a first end wall connecting wall normally extending from the terminus of said one side edges, said first connecting wall being regularly inwardly stepped in cross-section, each of said steps having an inwardly directed shoulder and an outwardly directed portion, a second end wall connecting wall positioned next to said first connecting wall and parallel to a line drawn through said inwardly directed shoulders thereof, said second connecting wall having a series of outwardly directed bead extensions proximate said first connecting wall and distal from said shoulders thereof, the normal distance in relation to the plane of said second connecting wall and between each resultant bead and shoulder series being generally equal to the thickness of the end wall disposed therein.

8. Connection means for a bird station including bottom, side and end walls wherein the outer surface of a first of said walls is step wise sloped downwardly away from a second of said walls at their point of interconnection, said first side wall having an ear opening therethrough, said second wall having an ear connection member projecting above the outer surface of said first wall through said ear opening and provided with a connecting pin opening therethrough, said first wall having an upstanding ledge proximate the opening therethrough and on the lower sloped portion thereof, and a tapered connecting pin spanning one of said steps of said first wall, downwardly directed through said pin opening and contacting said step above said ear opening and said ledge below said ear opening.

References Cited by the Examiner

UNITED STATES PATENTS

| | | | |
|---|---|---|---|
| D. 170,833 | 11/1953 | Rebora | 119—23 |
| 2,775,226 | 12/1956 | Early | 119—52 |
| 2,931,336 | 4/1960 | Cather | 119—51 X |
| 3,022,768 | 2/1962 | Lynch | 119—23 X |
| 3,115,865 | 12/1963 | Parkes et al. | 119—52 |
| 3,195,507 | 7/1965 | Miller | 119—23 |
| 3,244,148 | 4/1966 | Long | 119—23 |
| 3,250,249 | 5/1966 | Nelson et al. | 119—23 |

SAMUEL KOREN, *Primary Examiner.*

ALDRICH F. MEDBERY, *Examiner.*